United States Patent [19]
Driggett et al.

[11] Patent Number: 5,902,755
[45] Date of Patent: *May 11, 1999

[54] HIGH STRENGTH COMPOSITE MATERIALS

[75] Inventors: Richard A. Driggett, Elgin; William C. Scott, Maple Park, both of Ill.

[73] Assignee: Tox-Wastech, Inc., Wheaton, Ill.

[*] Notice: This patent is subject to a terminal disclaimer.

[21] Appl. No.: 08/848,572

[22] Filed: Apr. 28, 1997

Related U.S. Application Data

[63] Continuation-in-part of application No. 08/509,249, Jul. 31, 1995, Pat. No. 5,624,744, which is a continuation-in-part of application No. 08/057,234, May 3, 1993, abandoned.

[51] Int. Cl.⁶ .................................................. B32B 17/02
[52] U.S. Cl. ........................ 442/172; 442/173; 442/175; 442/179; 523/444; 523/445; 523/466
[58] Field of Search .................................. 442/129, 179, 442/172, 173, 175; 428/301.4; 523/444, 445, 466

[56] References Cited

U.S. PATENT DOCUMENTS

| | | |
|---|---|---|
| 3,217,083 | 11/1965 | Gore . |
| 3,455,338 | 7/1969 | Pollit . |
| 3,528,954 | 9/1970 | Carlson . |
| 3,635,926 | 1/1972 | Gresham et al. . |
| 3,718,181 | 2/1973 | Reilly et al. . |
| 3,787,281 | 1/1974 | Effenberger . |
| 3,833,453 | 9/1974 | Segal . |
| 3,879,430 | 4/1975 | O'Rear et al. . |
| 4,037,013 | 7/1977 | Sprague . |
| 4,045,408 | 8/1977 | Griffith et al. . |
| 4,123,602 | 10/1978 | Ukihashi et al. . |
| 4,132,681 | 1/1979 | Field et al. . |
| 4,339,332 | 7/1982 | Jasperson . |
| 4,414,356 | 11/1983 | Michel . |
| 4,422,992 | 12/1983 | Michel . |
| 4,505,541 | 3/1985 | Considine et al. . |
| 4,565,619 | 1/1986 | Gardner et al. . |
| 4,640,861 | 2/1987 | Binnersley et al. . |
| 4,647,360 | 3/1987 | Waters et al. . |
| 4,654,235 | 3/1987 | Effenberger et al. . |
| 4,818,640 | 4/1989 | Fukuda et al. . |
| 4,837,076 | 6/1989 | McCullough, Jr. et al. . |
| 4,857,093 | 8/1989 | Prewo et al. . |
| 4,880,483 | 11/1989 | Baldi . |
| 4,913,953 | 4/1990 | Prewo et al. . |
| 4,970,105 | 11/1990 | Smith, Jr. . |
| 4,975,321 | 12/1990 | Gentile et al. . |
| 5,015,116 | 5/1991 | Nardone et al. . |
| 5,061,423 | 10/1991 | Layden . |
| 5,069,959 | 12/1991 | Gentile et al. . |
| 5,082,721 | 1/1992 | Smith, Jr. et al. . |
| 5,098,496 | 3/1992 | Breitigam et al. . |
| 5,102,700 | 4/1992 | Baldi . |
| 5,118,560 | 6/1992 | Tredway . |
| 5,156,987 | 10/1992 | Sandhu et al. . |
| 5,182,078 | 1/1993 | Baldi . |

OTHER PUBLICATIONS

"Fluoroepoxy Resin for Moisture Vapor Barrier Coating and Other Applications," by Sheng Yen Lee and James R. Griffith, published in *Ind. Eng. Chem. Prod. Res. Dev.*, 1986, 25, pp. 572–577.
"Epon Curing Agent®S V–15, V–25, and V–40," published by Shell Chemical, Aug. 17, 1992, 3 pages.
"Preliminary Technical Bulletin, Epon® Resin DPS*–155 Epoxy Phenolic Novolac Resin," published by Shell Chemical Company, Oct. 1987, 2 pages.
"Technical Bulletin, Epon® Resin 826," published by Shell Chemical Company, Mar. 1990, 2 pages.
"The Shell Thermoset Resins Network," published by Shell Chemical Company, undated, 46 pages.
"Zoltek Product Data Sheet, Panex® Chopped Fibers," published by Zoltek Corporation, undated, 1 page.
"Zoltek Product Data Sheet, Panex 33 Continuous Carbon Fiber," published by Zoltek Corporation, undated, 2 pages.
"Fortafil Carbon Fibers, Continuous in Quality, Economical by Design," published by Akzo NV, undated, 11 pages.
"Teflon® Fluorocarbon Resin, Teflon® PTFE, FEP, and PFA Fluorocarbon Resins—Powders, Cubes, and Dispersions; Film and Tubing," published by Du Pont, undated, 14 pages.
"Teflon® PFA, Fluorocarbon Resin, Price List, Effective Feb. 1, 1991," published by Du Pont, undated, 2 pages.
"Teflon® PFA 340, Fluorocarbon Resin, Product Information," published by Du Pont, undated 4 pages.
"Teflon® FEP, Fluorocarbon Resin, Price List, Effective Jul. 1, 1986," published by Du Pont, undated, 4 pages.
"Teflon® FEP 100, Fluorocarbon Resin, Product Information, Extrusion and Molding Resin," published by Du Pont, undated, 4 pages.
"Material Information, Corning Code: 7740," published by Corning Incorporated, undated, 6 pages.
Kimble Glasses Spec Sheets, undated, 2 pages.

*Primary Examiner*—Christopher Raimund
*Attorney, Agent, or Firm*—Richard G. Lione; Brinks Hofer Gilson & Lione

[57] ABSTRACT

A ternary composite with thermal stability of up to at least 200° C. Is formed using a thermally stable matrix resin, high tensile fibers, and borosilicate or sodium tetra borate glass particulates. The composite has stability to acids, toxic wastes and may be formed into sheets, shapes, tubes, containers, flooring materials and the like for use in aerospace, defense, automotive, industrial, nuclear containment or simply building material applications.

9 Claims, No Drawings

HIGH STRENGTH COMPOSITE MATERIALS

RELATED APPLICATION

This application is a continuation-in-part of application Ser. No. 08/509,249, filed Jul. 31, 1995, now U.S. Pat. No. 5,624,744 which is a continuation-in-part of application Ser. No. 08/057,234, filed May 3, 1993, now abandoned.

FIELD OF THE INVENTION

This invention relates to composite materials which are stable to high acid concentrations and are anticipated to be stable for use in toxic waste disposal. The invention involves compositing materials including various matrix resins providing thermal stability to at least 200° C. and acid and toxic waste stability at temperatures to at least 100° C. Such matrix resins include thermoplastic fluoropolymer resins, thermosetting epoxy resins and thermosetting fluorinated resins. These matrix resins are then composited with intermediate to high modulus carbon fibers or other high tensile fibers and borosilicate glass particulate or sodium tetra borate and silicate additives, for example, to form the structurally stable composite materials of this invention.

BACKGROUND OF THE INVENTION

Several individuals have taught structural composites using fluoropolymers reinforced with continuous filament fibers. These composites have strength and provide chemical stabilities. For example, Gentile et al. in U.S. Pat. No. 5,069,959 teaches a composite comprising a fluoropolymer resin matrix reinforced with continuous filament aligned fibers for use in corrosive high temperature environments. Gentile's matrix PFA fluorocarbon resin is reinforced with continuous filament fibers and the composite has a flex modulus above 5 million psi.

Gentile et al. in U.S. Pat. No. 4,975,321 teaches a composite comprising fluoropolymer resin matrix reinforced with continuous filament aligned fibers for use in corrosive high temperature environments. The continuous fibers used are Hercules AS4 continuous graphite filaments coated with ethylene tetrafluoroethylene copolymer resins, although the composite may contain other resins. The continuous filament fiber may also be glass fibers or aramid fibers.

R. H. Michel in U.S. Pat. No. 4,422,992 teaches an extrusion process for blending carbon fibers and tetrafluoroethylene copolymers and the formation of laminates therefrom.

W. Novis Smith, Jr. et al. in U.S. Pat. No. 5,082,721 provides a fabric for protecting garments which fabric has high tensile fibers bonded by a film layer which film comprises at least one of multiple polyhalogenated resins, with ethylene-vinyl alcohol copolymers bonded on the bottom surface of the fabric. The high tensile fabrics utilized include polyamides such as Kevlar®, polyphenylene/polyphenylene oxide filaments, such as Nomex® fibers, and carbonaceous polymeric materials such as oxidized polyacrylonitrile fibers, and blends thereof. The polyhalogenated resins of Smith et al. included fluorinated ethylene perfluoroalkyl-vinylether copolymer resins (PFA) and perfluoroethylene perfluorinated propylene copolymer (FEP). Smith, in U.S. Pat. No. 4,970,105 also teaches a fabric for use in manufacture of protective garments, containers and covers comprising an inner layer of a tear-resistant high tensile fabric and a film layer bonded on at least one surface of the fabric comprising a multiply poly-halogenated resin. Again the polyhalogenated resins are fluorinated resins described above. The high tensile fibers utilized include polyamides such as Kevlar, the Nomex nylons, and the PET (polyethylene terephthalate) fibers, and blends of these fibers with polybenzamidazoles and oxidized polyacrylonitrile fibers (carbon fibers).

Finally, Fukuda et al. in U.S. Pat. 4,818,640 discloses a carbonaceous composite product primarily used for fuel cell electrodes which is produced by joining carbonaceous materials together by melt adhesion of tetrafluoroethylene resins or with tetrafluoroethylene resins mixed with highly electroconductive carbon blacks.

Although the above efforts have formed composites, these composites are not taught to be useful in containment of high acid components and particularly in containment of toxic waste materials which may also contain highly acidic materials.

It is a goal of the instant invention to provide a chemically resistant, acid resistant composite material which can hold for a period of at least 20 years, highly acidic and/or toxic wastes in appropriately designed containers.

It is also a goal of the instant invention to provide a chemically resistant, and particularly acid resistant composite material by compositing certain matrix resins having good thermal stability when so composited, such matrix resins including thermoplastic or thermosetting resins with carbon fibers or other high tensile fibers and with selected borosilicate glass particulate or sodium tetra borate and silicate additives.

It is a goal of the invention to provide for a composite having good thermal stability, high strength, and both acid resistance and chemical resistance for toxic wastes. Such a composite would include a matrix resin capable of thermal stability of at least 200° C. within the cured composite, and the matrix resin structurally reinforced with selected fibers, with the matrix resin having interspersed therein borosilicate glass particulate or sodium tetra borate and silicate additives, which chemically bond to the monomers of the fluorinated resins.

SUMMARY OF THE INVENTION

An object of the invention is to provide a chemically resistant, acid resistant composite material which comprises a solvent and heat resistant organic matrix resin, fibrous carbon or other high tensile fibers, and borosilicate glass particulate or sodium tetra borate and silicate additives. Preferably, the chemically resistant, acid resistant, toxic waste resistant composite materials comprise at least 20 to about 70 volume per cent of a matrix resin capable of providing the composite good thermal stability to at least 200° C., which matrix resin may be a thermoplastic/thermosetting resin. The composite also comprises from about 20 to about 65 volume per cent of high tensile fibers. The preferred fibers are selected from continuous carbon fibers, carbon fiber mats, carbon fiber fabrics, unidirectional carbon fibers, unidirectional carbon fiber prepregs or chopped or milled carbon fiber. The composite additionally comprises inorganic materials such as borosilicate or sodium tetra borate and silicate additives glass particulate ranging from 5 to about 50 volume per cent of the composite material.

Preferably, the acid resistant, thermally stable and structurally reinforced composite comprises either a thermoplastic or a thermosetting matrix resin capable of providing the composite heat stability to at least 200° C. and being within the range of about 30 to about 50 volume per cent of the composite. The composite also preferably comprises selected carbon fibers, the carbon fibers being present at from about 40 to about 60 volume per cent of the composite. The composite also preferably comprises borosilicate glass particulate or sodium tetra borate and silicate additives, said particulate or additives preferably present at from about 5 to about 20 volume percent. Glass particulates should have an average particle diameter ranging from about 3 microns to about 2,500 microns, preferably an average particle diameter between about 7 to about 1,500 microns, and most preferably an average particle diameter between about 20 to about 500 microns. Glass particulates may also be bimodal or trimodal in terms of average particle diameters, that is, its particles may come from mixtures of differently sized glass particulates.

The acid resistant toxic waste resistant structurally reinforced and thermally stable composites of our invention are preferably formed with either thermoplastic halogenated polymers, particularly thermoplastic fluoropolymers or fluorinated polymers, thermosetting epoxy resins that provide for high temperature stability (at least 200° C.) after they have set and also provide certain acid stabilities, or fluorinated thermosetting resins.

Carbon fibers used are preferably continuous and unidirectional fibers and may be preimpregnated with a number of different resins, including, but not limited to, epoxies and fluoropolymer resins. Although it is preferred to have a matrix polymer that is similar to the impregnating polymer on the carbon fiber, it has been found that thermosetting epoxy resin impregnated carbon fibers work acceptably in combination with the fluoropolymers of the invention, for example.

DETAILED DESCRIPTION OF THE INVENTION

The Matrix Resins

Thermoplastic matrix resins useful in our invention are molten, or soften so that blending can occur, at temperatures of at least 175° C. or up to 350° C., or higher. These resins are fluoropolymers which may be selected from the group consisting of PETFE (ethylene-tetrafluoroethylene) fluoropolymer, PFA (perfluoro-alkoxyether) fluorocarbon resins, FEP (fluorinated ethylene propylene) polymers, P-ECTFE (ethylene-co-clorotrifluoroethylene polymers), PVDF (polyvinylidene fluoride), or mixtures thereof. Further detailed description of PFA and FEP resin are later given. Preferably, the matrix thermoplastic resins are the PFA (perfluoroalkoxy fluorocarbon) resins, the FEP (fluorinated ethylene propylene) resins, or mixtures thereof. When mixtures of PFA resins and FEP resins are used, the mixture normally ranges, in weight ratio of PFA to FEP, from about 9:1 to about 1:9, preferably from about 2:1 to about 1:2, and most preferably about 1:1 PFA:FEP.

Advantageously, the preferred fluoropolymer resins are fluorinated ethylene perfluoro alkyl vinyl ether copolymer resins (PFA) and/or perfluoroethylene perfluorinated propylene copolymer (FEP). These resins may be represented by polymers of the formulas:

$$\{CF_2-CF\{O(CF_2)CF_3\}_x CF_2-CF_2\}_n$$

-continued

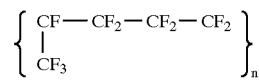

where both x and n are sufficiently large to yield average molecular weights of about 120,000 to 200,000 for the FEP polymers and about 115,000 to about 220,000 for the PFA polymers.

These types of fluoropolymers are commercially available and are sold by DuPont de Nemours, Wilmington, Del. under the trademarks TYZEL, TEFLON, and TEDLAR, and by Allied Chemical Company, Morristown, N.J. under the trademarks HALAR and ACLOR. These compounds should be meltable and processable at temperatures up to at least 175° C. and sometimes as high as 350° C.

The thermosetting matrix resins may be epoxy resins or blends of epoxy resins such as, for example, Epon 826 resin supplied by Shell Chemical Company and described as a Bisphenol-A-Epichlorohydrin based epoxy resin, Shell Code 43238, CAS No. 25068-38-6. This material is described as an epoxy resin produced by the condensation reaction of epichlorohydrin and Bisphenol-A with residual levels of epichlorohydrin controlled to no more than one part per million maximum. Bisphenol A and some epoxy resins made from it are described in U.S. Pat. No. 5,098,496, which is incorporated herein by reference.

Epon resins are characterized by the presence of epoxide functionality.

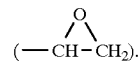

The most widely used Epon resins are the reaction products of epichlorohydrin and bisphenol-A. The molecular weight of the resin is a function of the ratio of the reactants. An idealized structure appears below:

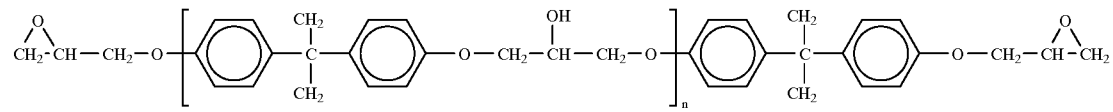

Typical liquid Epon resins have n values of 0 to 1, whereas solid grade Epon resins have higher n values. Epon® 826 resins have an average n value of about 0.8.

Flame retardant versions of the bisphenol-A/epichlorohydrin resins are also available. These resins, which are available in varying molecular weights, acquire their fire-retardant characteristics through bromine substitution on the phenyl rings of the bisphenol-A.

In addition to the bisphenol-A based resins, there are several other types of epoxy resins of commercial significance: namely, the aliphatic and cycloaliphatic epoxy resins, the glycidated novolacs, and the tetraglycidyl ether of tetraphenylolethane [Epon resin 1031]. The latter two types of materials, having a high aromatic ring content combined with polyfunctionality, provide increased thermal stability for high temperature applications. The aliphatic resins are sometimes used in applications requiring lower viscosity.

The Shell Epon 826 resin may be used by itself or may be blended with Shell's Epon resin DPS-155, CAS Registry No. 9003-36-5, which is described as an epoxy phenolic Novalac resin having the structure:

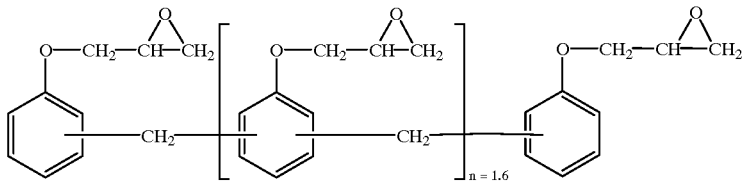

wherein x ranges from about 1–4, averaging about 1.6.

When these epoxy resins are used, by themselves or in combination, they normally are blended with an epoxy resin curing agent of which there are many known to the artisan. The curing agent is used to enhance polymer growth, build molecular weight, and encourage three dimensional structures by the crosslinking of the epoxide resins used as starting materials.

Preferable is an Epon® (R) V-40 curing agent, available commercially from Shell and described in their trade literature as a fatty acid polyethylene polyamine-based polyamide mixture. This mixture contains Dimer fatty acid polyamides and triethylene-tetramine, i.e. the Shell MSDS (material safety data sheet) for the EPON® curing agent (R) V-40 states that the product contains from 84 to 94% fatty acid polyamides and from 6–16% triethylenetetramine.

Other curing agents are also available, for example from Shell Chemical Co. They include Epon® V-15, V-25, the V-40 above, and V-50 Epon Curing Agents. All of these products are condensation products of poly amines and dibasic acids produced by the polymerization of unsaturated fatty acids. They may be used in combination with amines particularly multi-functional polyamines such as the triethylene tetramine components in Epon V-40 Curing Agent above. Such so called amide or polyamide curing agents are described in the "Handbook of Epoxy Resins", authored/edited by Lee and Neville, McGraw-Hill 1967, reprinted 1982, chapter 10, "Amides and Miscellaneous Nitrogen Compounds in Epoxy Resin Curing Agents," pg. 10–6, which reference is incorporated herein by reference.

When using these thermosetting epoxy resins to manufacture our composite materials, Bisphenol-A-Epichlorohydrin epoxy resin is normally used, i.e. the Epon® 826 resin alone or the combination of the Epon 826 resin with from about 0.01 to about 50 weight per cent (based on total resin weight) of the epoxy phenolic Novalac resins i.e., the EPON® DPS-155, CAS Registry No. 9003-36-5 resins.

In addition to the use of the starting resins described above, the curing agent is added at a weight ratio of from about 5:1 to about 5:6 total resin : curing agent. The preferred curing agent is from about 84–94% Dimer fatty acid polyamide blended with from about 6 to about 16 per cent triethylenetetramine. This blended combination is sold commercially as Epon® curing agent V-40. Any epoxy resin can be used as a thermosetting matrix resin, as long as the composite formed with the resin is thermally stable to at least 200° C. and stable to acid. By stable to acid we mean that a container formed by the composite can hold a 1:1 volume blend of water and concentrated sulfuric acid for at least three months at ambient temperatures without any visual indication of etching, surface deformities, or the like.

It is also advantageous to use one or more of a series of fluorinated resins. Following is a list of such resins which may be used (the list is not exhaustive):

fluorodiepoxides
fluoroadductamines
fluoropolyurethanes
fluoroacrylates
fluorosilicoamines
fluoropyrometallic anhydrides.

The fluorinated resin monomer chemically bonds with inorganic material and organic material incorporated in the composite.

Carbon Fiber or Other High Tensile Fibers

The carbon fibers useful in the invention may be any continuous fiber or continuous fiber which has been chopped or milled to a prescribed length, preferably not less than about ⅛ inches in length. These fibers have high to intermediate strengths and high to intermediate modulus with tensile strengths ranging from about 250 ksi (one thousand pounds per square inch) to about 550 ksi and tensile modulus ranging from about 30 Msi (million pounds per square inch) to about 50 Msi. The densities of the continuous carbon fibers are approximately about 0.060 to about 0.070 pounds per cubic inch, preferably about 0.065 pounds per square inch. The carbon fibers are usually round, having diameters of about 7–9 microns and contain from about 94–99 weight per cent carbon. The fibers may be chopped or milled, with chopped lengths available from ⅛", ¼", ½", 1" and 2" in length. The fibers may be sized or unsized.

Fibers may be used as is, or may be used as so-called prepregs and when used as prepregs are preferably used as unidirectional carbon fiber prepregs. These unidirectional carbon fiber prepregs have resin systems preimpregnated into and onto the fibers. These impregnating resin systems can include, but are not necessarily limited to, ABS resins, acetyl resins polyphenylene, polyphenylene oxide aromatic resins, polyamide resins, polycarbonate resins, polyesters, polyolefinic resins, fluoropolymer resins, polyvinylchloride resins, epoxy resins, phenolic resins, polyester resins, polyurethane resins, silicone resins, vinyl ester resins and the like. Preferably, the prepreg carbon fiber resins of choice in the practice of this invention are polyepoxy resins based on what is referred to as a 250° F. epoxy system. The preferred unidirectional carbon fiber prepreg is available commercially from Akzo through Fortafil Fibers Incorporated, P.O. 357 Old Cardiff Road, Rockwood, Tenn. 37854. These carbon fiber materials are supplied in rolls from 12 to 24 inches in width, and contain an Akzo F3(C)50K fiber type and are preferably preimpregnated with a 250° F. epoxy system having a yield time of approximate 12.5 minutes, a glass transition temperature of approximately 270° F., a resin flow average weight of approximately 10.3 per cent, relatively low viscosity during heat up and intermediate tack. The prepreg resin content can range from approximately 35 to 41 weight per cent based upon total weight of the unidirectional carbon fiber prepreg. The preferred resin content of the prepreg fiber is about 35 weight per cent, based on total prepreg fiber weight. Although these carbon fiber prepregs are available with glass fiber scrim backings, it is preferred to use the carbon fiber prepreg without these glass fiber scrim backings.

The term carbon fiber/fabric includes the fibers described, the carbon fiber fabrics to be described, or mixtures thereof.

If admixed, the mixtures can be alternate use of fiber and fabric, or vice versa, or use of random mixtures of fiber and fabric. In admixture, the use of fabrics with chopped or milled fabric is also included.

Typical laminate properties of a 150 FAW, scrimless, unidirectional 60 volume per cent fiber laminate (Epoxy matrix Resin) would be about 290 ksi tensile strength, 19 Msi tensile modulus, 280 ksi flexural strength, and 18 Msi flexural modulus, absent the borosilicate particulates.

Carbon fiber fabrics may also be used in our composites. The fabrics are normally Woven Low Oxidation Carbon Fabrics formed from polyacrylonitrile fibers and fabrics made from spun yarn. For example, the Zoltek Corporation, 3101 McKelvey Road, St. Louis, Mo. makes available several PANEX® Woven Low Oxidation Carbon Fabrics, the properties of which are presented in Table

TABLE 1

| Property | Carbon Fabric 1 | Carbon Fabric 2 | Carbon Fabric 3 | Carbon Fabric 4 |
| --- | --- | --- | --- | --- |
| Construction | plain | plain | 8H-Satin | 2 × 2 Basket |
| Yarn input | 2/32 | 2/10 | 2/10 | 1.7 tpi |
| Count (W × F) | 48 × 44 | 29 × 28 | 38 × 38 | Roving |
| Weight | yarns/in | yarns/in | yarns/in | 12 × 12 yarns/in |
| Width | 3.4 oz/yd$^2$ | 6.5 oz/yd$^2$ | 8.5 oz/yd$^2$ | 14.3 oz/yd$^2$ |
| Thickness | 33 inches | 42 inches | 33 inches | 33 inches |
| Density | 15 mils | 28 mils | 40 mils | 62 mils |
| Carbon Content | 1.75 g/cc | 1.75 g/cc | 1.75 g/cc | 1.75 g/cc |
| Oxidation Rate per hour @ 500° C. | 99% <1.0% | 99% <1.0% | 99% <1.0% | 99% <1.0% |

The above described carbon fibers, carbon fiber fabrics and carbon fiber prepregs are available from either the Akzo Company through Fortafil Fibers Incorporated whose address is provided earlier or from the Zoltek Corporation of St. Louis, Mo. Although Akzo's carbon fibers are preferred, carbon fibers manufactured by other manufacturers and particularly the carbon fiber fabrics from Zoltek Corporation can also be used as long as they provide comparable properties. The Akzo and Zoltek materials are primarily carbon fibers obtained by oxidizing, and optionally carbonizing polyacrylonitrile fibers or spun yarn fabrics to obtain a round black carbon fiber having a filament diameter of about 7.0 to 9.0 microns, and a density of about 0.060 to about 0.065 lbs/in$^3$, and containing at least 95 per cent carbon to about 99 per cent carbon and up to about 3.6 per cent nitrogen, 0.4 per cent hydrogen, 0.4 per cent oxygen, and about 0.6 per cent ash.

When a chopped or milled carbon fiber is used, it is normally preblended with the matrix resin, to which blend may be added borosilicate glass particulate. If sodium tetra borate and silicate additives are employed, they are added to the resins before any fiber is added to allow chemical bonding to take place. The entire ternary mixture is then used to form the composite materials of the invention. When the carbon fabrics are used, they are normally preshaped or layered and are wetted with the matrix resin, which resin may optionally be dissolved in an appropriate solvent such as methyl ethyl ketone. The remaining resin and borosilicate glass particulates are then added and the composite cured. Curing may be at temperatures ranging from about 175° C. to up to 350° C., or higher, and also may be under elevated pressure or under a partial vacuum, or reduced pressure, to encourage the elimination of gas bubbles in the final composite of this invention.

It is also contemplated that other high tensile fibers may be used in the composite in place of, or in combination with carbon fibers. Fibers which comprise the commercially available Kevlar fabric are one example.

The Glasses

The glass particulate materials which are used in our composites are primarily borosilicate or sodium tetra borate and silicate glasses. They are manufactured by typical procedures known to the artisan and contain boron oxide, sodium oxide, and silica. They may also optionally contain certain additional quantities of calcium oxide, talc and other inorganic or organic materials.

The preferred borosilicate glasses are commercially available from Kimble Industrial Glass Company (RIMAX®) at 37 Crystal Avenue, Vineland, N.J. or from Corning Glass, Corning, New York 14831. (PYREX®) Kimble Industrial Glass borosilicate glasses which work in this invention includes Kimble Amber 203 Borosilicate, Kimble EN-1, ES-1, IN-3, IN-5, KG-33, KG-35, RN-3, N-51A, and RS-7 Borosilicate glasses all in frit form. Preferred Kimble Borosilicate glasses are Amber 203, EN-1, KG-33, and N-51A Borosilicate glasses.

Corning Glass borosilicate glasses include Corning Code 7740, 7070, and similar borosilicate glasses, preferably ground to frit form to meet the particle sizes needed for this invention.

The borosilicate glasses are normally clear but may be white or amber in color, and are available and used primarily in a sand-like frit form. The frit form has the consistency of fine sand, but may be ground or crushed to smaller particle sizes. For example, Kimble Industrial Glass Company provides commercial quantities of borosilicate glass frit particulates in coarse frit, medium frit, and fine frit forms. The coarse frit contains particulates having a diameter of about 200–240 microns, the medium frit a diameter of about 20–25 microns, and the fine frit is ground to particle diameters of from about 7 to 10 microns. These various frits can be used singly, or in admixture.

The invention can use these borosilicate glasses where the average particle diameter ranges from about 3 microns to about 2500 microns. Preferably the average borosilicate glass particulate has an average particle diameter ranging from about 7 microns to about 1500 microns and most preferably from about 20 microns to about 500 microns. The borosilicate glasses or those borosilicate glasses modified by the addition of lime, slaked lime or calcium oxide and containing calcium normally have a density of approximately 2.10 to about 2.40 grams per cubic centimeter, preferably about 2.20 to 2.30 grams/cm$^3$, a thermal conductivity of approximately 0.0027 Cal/ cm$^2$/°C., a refractive index of from about 1.470 to about 1.480 at 589.3 nanometers, and have weathering and acid durability ratings which are superior.

For example, the borosilicate glasses of the invention have a weathering rating of 1 where weathering is defined as corrosion by atmospheric borne gasses and vapors such as water and carbon dioxide. Glasses rated 1 will almost never show any weathering effects, those rated 2 will occasionally be troublesome, particularly if weathering products cannot be removed; and those glasses rated 3 require very careful consideration in terms of their use in corrosive environments, and cannot be successfully used in the composites of this invention.

The acid durability of our borosilicate glasses is also excellent. An acid durability rating of 1, which is held by the preferred borosilicate glasses, is based upon their behavior when exposed to 5 per cent hydrochloric acid at 95° C. for 24 hours. The classification is as follows:

| Classification | Thickness loss (inches) |
| --- | --- |
| 1 | $<10^{-6}$ |
| 2 | $10^{-5}$ to $10^{-6}$ |
| 3 | $10^{-4}$ to $10^{-5}$ |
| 4 | $>10^{-4}$ |

Preferred materials useful in this invention are the frit borosilicate glasses available from either Kimble Industrial Sales or from Corning Incorporated. Kimble borosilicates are offered at densities ranging from 2.39 grams per cubic centimeter to about 2.15 grams per cubic centimeter. The refractive index for the sodium D line ranges from about 1.51 to about 1.47.

The glass may also be simply a borax containing glass. In other words, the glass may be a plain silicate glass containing sodium tetra-borate.

Other Inorganic Additives

It is also contemplated that other inorganic additives may be used. Examples of such elements are:

Borax (sodium tetra-borate), silicates, talc, calcium oxide,

Magnesium,

Iron,

Aluminum,

Silicon,

Sodium.

This list is not exhaustive, of course.

Other Organic Additives

It is further contemplated that other organic additives may be used. Examples of such elements are:

boron carbide, calcium carbide, magnesium carbonate hydroxide, aluminum carbide, sodium carbonate.

This list is not exhaustive, of course.

Methods of Manufacture

A method of manufacturing composite materials into sheets according to one embodiment of the invention involves providing an initial layer of matrix resin, with or without glass particulate. The selected fiber or fabrics, preferably the unidirectional prepreg carbon fibers described above, or the carbon fabrics of Table 1 are then added, followed alternately by fresh layers of matrix resin and additional unidirectional carbon fiber or fabric until a desired thickness of composite material is achieved. The direction of each layer of unidirectional carbon fiber may be rotated from 45° to 90° relative to the last layer of fiber applied. The unidirectional fiber may also be alternated with fabric or vice versa. The preferred thickness for the composites of the invention ranges from about $1/16$ of an inch to about $1/2$ of an inch, or thicker, and preferably ranges from about $4/32$ of an inch to about $10/32$ of an inch.

According to this embodiment, the matrix resin may be preblended with the glass particulate, selected and used throughout the layering of matrix resin and carbon fiber, or the last few layers or even just the final matrix resin material added may be the matrix resin into which has been evenly dispersed the glasses described above. This preformed material is then heated and may alternately be pressurized or cured under partial vacuum, then cooled until it sets to form the acid stable, toxic waste stable and thermally stable composite materials of the invention.

Each application of the matrix resin may contain the glass particulates so that the glass particulate is evenly dispersed throughout the matrix composite materials. If the last few or the final portion of matrix resin contains the glass, the glass particulate matter is generally unevenly dispersed throughout the composite and is concentrated at one surface of the composite relative to the perpendicularly adjacent surface.

Also, when using extrusion, vacuum, pultrusion, matched heat and non-heat molding, chopped or milled carbon fiber may be used in admixture with the selected resins which in turn may be blended with the glass particulates described above. This admixture then may be used to fill a mold to form shaped composite material forms. The shaped forms may be in the shape of containers and preferably these containers are designed for holding, preferably for at least 20 years, toxic waste and acid materials in a container that can reach dimensions of about 4 feet by 4 feet by 4 feet—10 inches, or larger, which container may have single or double walled construction. The container normally has a top of the same composite materials which top may be irreversibly sealed using the matrix resins or glass filled, carbon fiber reinforced matrix resins of this invention. The container may be vented, piped, check valved, and equipped with legs, supports, arms, hooks, fork-lift slots or other means to assist in moving, storing, stacking, or recovery from storage.

Preferably, when forming acid stable composite materials according to this embodiment of the invention, the matrix resin is an admixture of approximately equal weight of FEP fluoropolymer and PFA perfluoroalkoxy polymer. Alternatively, the matrix resin can be an admixture of a Bisphenol-A-Epichlorohydrin thermosetting epoxy resin such as the EPON®826 resins, or alternatively mixtures with an epoxy phenolic Novalac resin such as EPON® DPS-155, CAS Registry No. 9003-36-5 resin, normally at an equal weight ratio and containing from 20 to 120 per cent by weight, relative to total resin, of curing agent, which curing agent is described above. Other curing agents such as methyl ethyl ketone peroxide may be used, although the amine/amide fatty acid curing agents are preferred.

The matrix resin, either the thermoplastic fluoropolymer materials or the epoxy thermosetting resins are contained in the composite at a volume per cent ranging from about 30 to about 70 per cent. The fibers, or fabrics, or both are contained in the composite at a volume per cent ranging from about 20 to about 65 per cent, and the glass particulates, preferably having a particle size ranging from about 7 microns to about 1500 microns are contained in the structurally reinforced composite at a volume per cent ranging from about 5 to about 50 volume per cent. The composites may have the glass particulates evenly dispersed therethrough or they may contain an enriched side having at least a five per cent (relative) higher concentration of glass particulates than its perpendicularly opposite side. These so-called unevenly distributed glass particulate composites have the advantage of providing higher acid resistance at that side of the composite which contains higher glass concentrations.

When the composite is cured or set, the fibers/fabrics used, primarily are formed within the middle of the composite structure. This phenomenon is not unknown in the manufacture of composite materials and has been described in some of the other references cited above. These composites therefore have an enriched fibrous inner core and contain surfaces enriched in the matrix resins, either having evenly dispersed glass particulates or having an enriched glass particulate concentration on one side of the structurally reinforced composite.

The composite materials made by the afore-described methods can be formed in sheet form, in tubular form, in shaped forms, and can be molded into containers of different sizes. Preferably the composites can be molded into a container designed to hold toxic wastes, which container is preferably double walled, each wall separated by foam insulation and having support means to isolate the inner wall from the outer wall, supporting both in the double wall construction. The container may be open topped with a sealable top manufactured using the same composites. The top may be clamped and/or sealed in place using adhesives and sealers which may optionally be the same composite materials. The preferred container may be approximately 4'×4'×4'—10 inches and when sealed can contain up to 3000 pounds of toxic waste and/or acid waste materials.

To further describe the formation of our composite materials the following examples are presented.

EXAMPLE 1

About one pound of a 1:1 weight ratio of FEP and PFA fluoropolymers were heated to a molten state and mixed to achieve a homogeneous liquid blend of these thermoplastic fluoropolymers. Using this molten liquid, composites containing 40 volume per cent thermoplastic polymer blend and 60 volume per cent OPF Unidirectional carbon fiber prepreg (250° F. epoxy impregnation—35 weight % resin) were formed by alternate layering of thermoplastic resin and OPF carbon fiber prepreg. The carbon fiber fluoropolymer composites thus formed were shaped into shallow cups and cured.

In a variation of the above, borosilicate (Kimble KG-33) frit having an average particle diameter of from about 200–240 microns was evenly and homogeneously admixed with the molten fluoropolymer resin blend and another composite material was formed having 40 volume % resin blend, 52 volume % carbon fiber prepreg, and 8 volume % borosilicate particulates. This composite was cured and formed into shallow cups having a composite thickness of about $5/32$ to $6/32$ inches.

Using various dilutions (with water) of concentrated sulfuric acid, the cups formed above were filled to a level less than ¾ full and placed in the same ambient temperature environment for a period of about three (3) months, at which time the contents were dumped, the containers rinsed with water, and visually examined for signs of instability, wear, corrosion, etching, and surface imperfection.

At acid concentrations of 10 per cent sulfuric acid and above, the cups formed with composites absent borosilicate glass all showed evidence of surface etching, corrosion and imperfection. None of the cups formed from the borosilicate containing composites demonstrated any surface etching or corrosion, even with exposure to undiluted concentrated sulfuric acid.

EXAMPLE 2

A similar composite using a thermosetting epoxy resin, such as the EPON 826 resin, is made. The resin is blended with about 20 weight per cent curing agent after admixture with carbon fiber to form a composite having 40 volume per cent epoxy resin, 60 volume per cent carbon fiber prepreg.

A second composite containing 40 volume per cent epoxy resin, 52 volume per cent carbon fiber prepreg and 8 volume per cent borosilicate glass particulate, all as described earlier, is made. The composite is formed into shallow cups and cured at temperatures of about 200° C.

The cups are tested as above and the results are expected to be the same. Absent borosilicate particulates, the acid concentrations above 10% sulfuric acid, when contacting the cups formed with thermosetting matrix resins, stored at ambient temperatures for about three months, would demonstrate etching and surface corrosion. The borosilicate particulate containing thermosetting matrix resin-carbon fiber composites is expected to again demonstrate superior stability and minimal surface corrosion, etching.

EXAMPLE 3

An example of a process of making a material using a fluorinated resin is described as follows:

1. A ($C_6$) fluoroadductamine resin is provided;
2. borax, silicate, talc and calcium oxide in stoichemetric amounts are added;
3. a ($C_8$) fluorodiepoxide resin is then added and polymerization occurs, chemically bonding the various elements to the monomers of the resins; and
4. high tensile fiber such carbon fiber or a polyamide (Kevlar) fiber, for example, is then added (although this can be omitted in some products).

Those skilled in the art of composite manufacture will recognize that variations of these procedures may be followed. These variations may include but are not necessarily limited to the use of thermoset, extrusion, vacuum, pultrusion, matched heat and non-heat molding techniques, the versatility of our composites depending upon the application desired. The general method of most of the applications for compositing the materials of our invention would provide for sheet composites ranging in thickness from about $1/16$ of an inch to about ½ of an inch, preferably from about $4/32$ inches to about $10/32$ of an inch in thickness. These materials can be composited as sheet goods, containers, shaped or molded goods, or may be supplied as coating materials, liners for containers, molded sheets, walled additions, and the like. Thinner composites using our ingredients can be used for liners which protect the lined container from toxic and hazardous waste, and liners for toxic and hazardous waste dumpsites. The containers manufactured from our composite materials can be used for the containment and disposal of toxic and hazardous waste, protection from acid and/or toxic wastes, and are anticipated for use in containers or liners for containers used in the transportation of toxic acid components, and hazardous materials via rail, air, truck, or ship.

These ternary composite materials may also be useful as liners for existing toxic and hazardous containers and drums and can be contained in fuel cells, fuel tanks, trailer floor beds and flooring materials, laboratory bench top materials, and containment tanks for the chemical industry and related industries requiring the containment of acid or toxic components. Such liners are preferably manufactured using the carbon fiber fabrics described in Table 1, or similar high tensile fabrics.

Our composites can be used for retaining waste materials and can be used in piping, pumps or valving useful in systems handling high acid or toxic components. The composites have unique physical properties including being fire retardant, non-conductive, extremely strong, chemically-resistant and easily cleaned. The artisan can derive from the descriptions above various alternatives for the use of our invention. These alternatives are intended to be included in the invention, which invention is described in the following claims.

We claim:

1. An acid resistant, structurally reinforced composite comprising:
   a) at least one of a thermoplastic and a thermosetting matrix resin capable of providing heat stability to the composite of at least 200° C. in a volume of 30 to 70 percent;
   b) carbon fibers or other high tensile fibers in a volume of 20–65 percent; and
   c) borosilicate glass particulate or sodium tetra borate and silicate additives in a volume of 5 to 50 percent.

2. The composite of claim 1 wherein:
   d) the resin is selected from the group consisting of PETFE (ethylene-tetrafluoroethylene) fluoropolymer, PFA (perfluoroalkoxy) fluorocarbon resin, FEP (fluorinated ethylene propylene), P-ECTFE (ethylene-co-chlorotrifluoroethylene), PVDF (polyvinylidene fluoride), and mixtures thereof.

3. The composite of claim 1 wherein:
   d) the fibers are oxidized polyacrylonitrile intermediate to high modulus carbon fibers, unidirectional carbon fiber prepregs, chopped or milled carbon fiber, chopped carbon fiber prepregs, carbon fiber fabrics or mixtures thereof.

4. The composite of claim 1 wherein:
   d) glass particulate is added and has an average particle diameter ranging from about 3 microns to about 2500 microns.

5. The composite of claim 4 wherein:
   e) the glass particulate has an average particle diameter ranging from about 7 microns to about 1500 microns.

6. An acid resistant, structurally reinforced composite comprising:
   a) a thermosetting fluorinated resin monomer capable of providing heat stability of the composite to at least 200° C. in a volume of 30 to 70 percent;
   b) organic structural reinforcing means in a volume of about 20 to 65 percent; and
   c) a glass particulate containing sodium tetra borate and silicate additive in a volume of 5 to 50 percent;
   d) wherein said monomer chemically bonds with inorganic and organic material in the composite.

7. The composite of claim 6 wherein:
   d) said resin is an epoxy resin in a volume of about 35 to 50 percent;
   e) said reinforcing means is at least one of unidirectional carbon fibers and carbon fiber fabric in a volume of about 40 to 60 percent; and
   f) said glass particulate has an average particle diameter from about 5 to 25 percent.

8. An acid resistant, structurally reinforced composite comprising:
   a) a thermosetting, Halogen resin in a volume of 30 to 70 percent;
   b) carbon fiber in a volume of 20 to 65 percent; and
   c) borosilicate glass particulate in a volume of 5 to 50 percent or sodium tetra borate and silicate additives.

9. An acid resistant, structurally reinforced composite comprising:
   a) a thermoplastic fluoropolymer resin capable of providing heat stability of the composite to at least 200° C., in a volume of about 35 to 50 percent;
   b) unidirectional carbon fibers, carbon fiber fabric, or mixtures thereof in a volume of about 40 to 60 percent; and
   c) borosilicate glass particulates ranging in average diameter from about 7 microns to about 1500 microns, in a volume of about 5 to 25 percent.

* * * * *